Jan. 1, 1935. H. C. BERKELEY Re. 19,409

FREEZING TRAY

Original Filed Dec. 21, 1931

INVENTOR
Harrison C. Berkeley
BY
Spencer Hardman & Fehr
his ATTORNEYS

Reissued Jan. 1, 1935

Re. 19,409

UNITED STATES PATENT OFFICE 19,409

FREEZING TRAY

Harrison C. Berkeley, Dayton, Ohio, assignor, by mesne assignments, to General Motors Corporation, Detroit, Mich., a corporation of Delaware Original No. 1,931,053, dated October 17, 1933, Serial No. 582,349, December 21, 1931. Application for reissue April 30, 1934, Serial No. 723,280

11 Claims. (Cl. 62—108.5)

This invention relates to freezing trays especially such as are used for freezing ice blocks in mechanical refrigerators.

One piece flexible non-metallic freezing trays are now well known and in general use. The chief advantage of such flexible non-metallic trays lies in the fact that the frozen ice blocks may be easily removed therefrom by flexing the tray and without melting the ice free therefrom. However, a serious disadvantage of such non-metallic trays lies in the fact that the efficiency and rapidity of freezing is decreased due to the relatively poor heat conductivity of the non-metallic materials, such as flexible rubber, of which such trays are made. Now the object of this invention is to provide a freezing tray having all the advantages of easy removal of the frozen ice blocks inherent in the present non-metallic flexible trays and at the same time having the advantage of rapid freezing due to what is in effect a removable thin metal bottom for a flexible non-metallic tray.

Another object is to provide such a tray having a very easily handled and economically made structure.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 1:
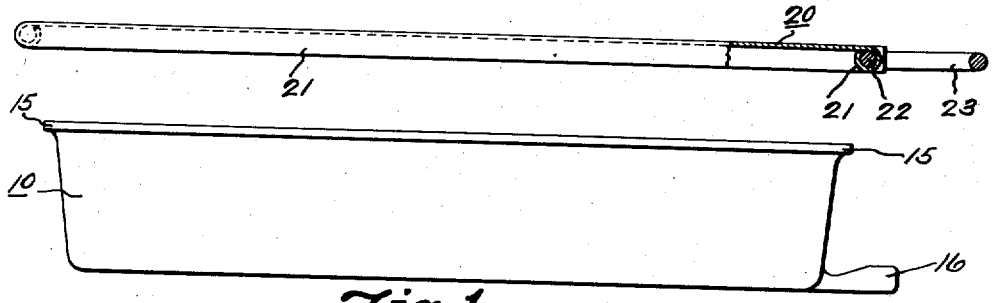
Fig. 1 is a side view of a flexible rubber freezing container and the metal cover plate therefor in spaced relation, showing how the cover plate is simply set upon the container after it is filled with water.

Numeral 10 designates a molded one-piece flexible rubber container having partitions 11 therein which divide up the space into a plurality of ice-pockets 12 to form ice blocks of any desired or suitable size. Container 10 may be made from any suitable flexible material capable of sufficient flexing or distortion to remove the ice blocks therefrom but soft high grade flexible rubber has been found to be the most satisfactory to date. The side and end walls 13 and 14 of container 10 are preferably provided with an outwardly flaring flexible flange 15 which extends continuously all around the periphery of said container 10 in the same plane. When the container 10 is filled level full with water and the metal cover plate 20 is set thereupon, as indicated in Fig. 1, the peripheral flexible flange 15 will seat directly upon the flat plate 20 with a neat fit. This cover plate 20 is preferably provided with a slightly raised marginal edge 21, which in the form shown is provided by a reinforcing resilient wire 22 about which the raised edge 21 is curled, as clearly illustrated. This wire 22 preferably extends at one end to form the handle 23 by means of which the assembly may be more easily handled when the container 10 is filled with water.

Figure 3:
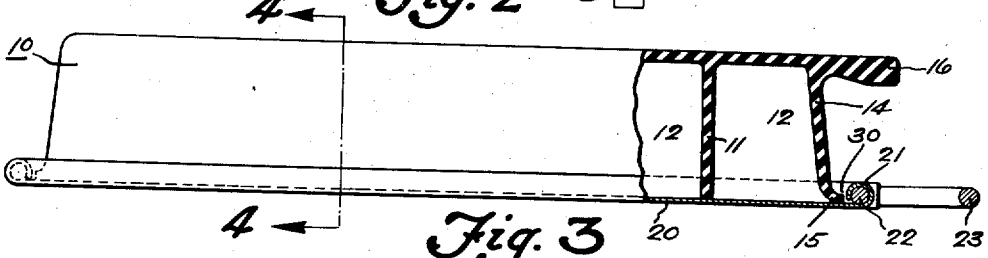
Fig. 3 is in part a side elevation and in part a section taken on line 3—3 of Fig. 2.
Figure 4:
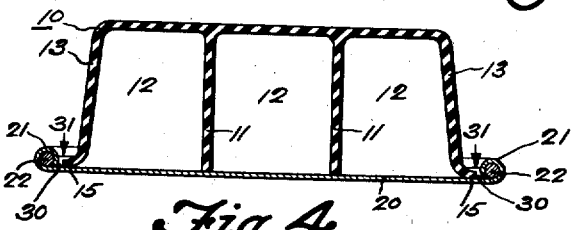
Fig. 4 is a transverse section taken on line 4—4 of Fig. 3.

After container 10 is filled with water and the cover plate 20 set thereupon, this assembly is inverted as a unit to the position clearly shown in Figs. 3 and 4. The water in container 10 will then ordinarily leak out slowly until it forms a water seal at 30 all around the container 10 between the flange 15 thereof and the raised margin 21 of pan 20. Fig. 4 clearly shows how the atmospheric pressure acting downward as illustrated by arrows 31 will positively prevent further leakage of water from container 10 as soon as the water seal 30 covers the joint between flange 15 and the bottom plate 20. Only a very thin film of water will do this since such a water film will prevent air bubbles entering the container under flange 15, and if no air bubbles enter the water will be retained up within container 10 against gravity action by the partial vacuum existing in the pockets 12 within container 10. If the flange 15 is molded with a very smooth and accurate plane surface the raised margin 21 of plate 20 will be unnecessary since the surface tension of the film of water between flange 15 and plate 20 will be sufficient to prevent air entering container 10 under the flange 15 and thus the water is prevented from leaking out due to the partial vacuum occurring within container 10 as soon as the water begins to leak out.

Figure 2:
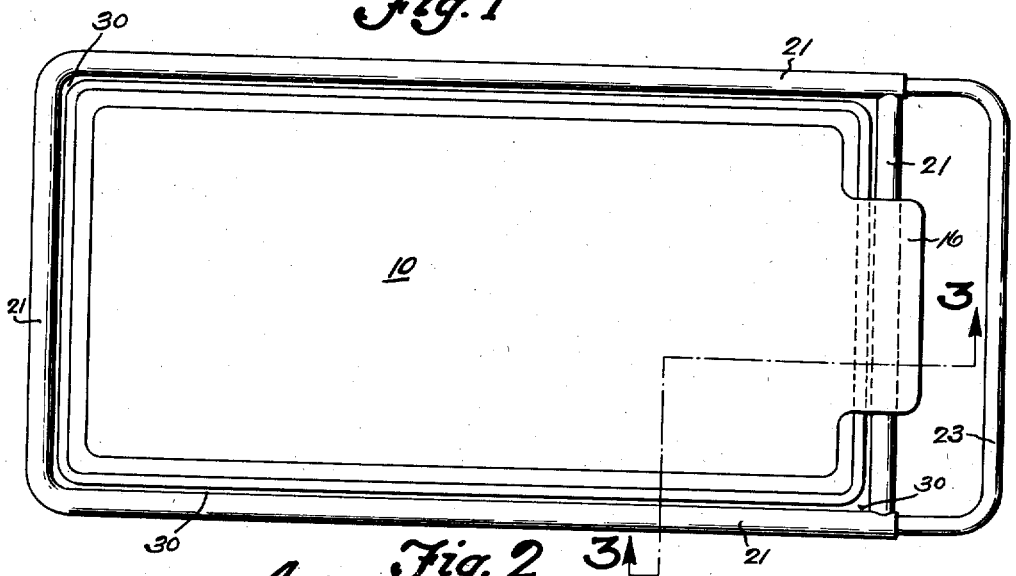
Fig. 2 is a plan view of the container and metal plate in inverted or freezing position.

The inverted assembly shown in Figs. 2, 3 and 4 is inserted within a freezing chamber of a refrigerator, preferably resting directly upon a refrigerated metal shelf or support. Heat is rapidly conducted from the water through the thin metal bottom 20 which ordinarily rests directly upon a refrigerated metal support. Thus this invention provides in effect a flexible non-metallic container 10 having a metal bottom which greatly enhances the rapid freezing of the water. The thin water seal 30 freezes very quickly and thereafter if desired for any reason the assembly may be removed and handled quite carelessly without danger of the water in container 10 leaking out or the plate 20 becoming separated therefrom.

After the water is completely frozen the assembly is removed as a unit and the flexible metal plate 20 is easily stripped from its frozen bond with the ice in container 10 by lifting up on handle 23 or otherwise bending or twisting the flexible plate 20, the ice blocks remaining within the pockets 12. A handle 16 is molded integrally upon container 10 to facilitate handling of the container and also serves as a convenient means to hold said container 10 when the metal plate 20 is stripped therefrom as described in the preceding sentence. After removal of plate 20 the ice blocks are easily removed from the flexible container 10 either one or several at a time or all at once, simply by flexing said container in any desired manner.

This invention therefore provides what is in effect a quickly and simply removable flexible cover plate for a flexible non-metallic freezing tray. No thawing of the frozen bond between the ice and its confining parts is necessary.

While the form of embodiment of the present invention as herein disclosed, constitutes a preferred form, it is to be understood that other forms might be adopted, all coming within the scope of the claims which follow.

What is claimed is as follows:

1. A freezing device comprising: a flexible non-metallic container having ice pockets therein and adapted to be filled with water, and a flexible metal plate upon which said flexible container rests flatly in inverted position, and means providing a water seal around the peripheral lower edge of said container whereby water will be held within said container against gravity action by atmospheric pressure.

2. A freezing device comprising a container having ice pockets therein and adapted to be filled with water, a flexible metal plate upon which said container rests in inverted position, and means providing a water seal around the peripheral lower edge of said container whereby water will be held up within said container against gravity action by atmospheric pressure.

3. A freezing device comprising: a flexible non-metallic container having ice pockets therein and adapted to be filled with water, a flexible metal cover plate upon which said container rests in inverted position in such manner that water will be retained within said container against gravity action until the water is frozen, said metal plate being capable of being stripped from its frozen bond with said container and its contents by flexing same to facilitate the removal of the ice.

4. A freezing tray comprising: a one piece flexible rubber container and a flexible metal cover plate fitting flatly upon the peripheral edges of said container, said container being adapted to be filled with water, the metal cover plate applied thereto and the assembly then inverted during the freezing of the water, whereby rapidity of the freezing of the water in said container is enhanced by the transfer of heat from said water through said metal cover plate.

5. A freezing device comprising: an open faced flexible non-metallic container adapted to be filled with water and having a continuous flat peripheral edge, and a metal plate upon which said flat peripheral edge fits in such manner that the water will be retained up within said container at the joint between said peripheral edge and said plate when said container and plate are inverted in fitted together relation.

6. A freezing device having an open-top water tray having peripheral side walls, partitioning means for dividing the space within said tray into ice block compartments, a flexible metal cover for said tray resting by gravity with a sealed fit upon the upper edges of said peripheral side walls when the tray is in upright position, the assembly of the filled tray and cover being adapted to be inverted and maintained indefinitely in inverted position within a freezing chamber without leakage, leakage being substantially prevented by a water seal at the loose joint between said tray and cover.

7. A freezing device comprising: a flexible rubber water tray having substantially vertical flexible rubber partition members, a metal cover for said tray adapted to contact the water contained within said rubber tray during freezing whereby to increase rapidity of freezing of the water, and opposed spaced handle means on said rubber tray and metal cover to facilitate the pulling apart of said rubber and metal members without melting the ice bond during the removal of the contents.

8. A freezing device comprising: an open-top water tray, a metal cover for said tray adapted to contact the water within said tray during freezing whereby to increase rapidity of freezing, flexible non-metallic sealing means forming the joint between said cover and said tray and providing a flexible seal therebetween which will permit said tray and cover to be more easily pulled apart when there is a frozen ice bond therebetween, and opposed handle means on said tray and cover respectively to facilitate the act of pulling them apart.

9. A freezing device comprising: an open-top water tray having side walls, partitioning means for dividing the space within said tray into ice block compartments, and a flexible metal cover resting upon the upper periphery of said side walls when the tray is in its upright position in such sealing contact therewith that when the filled assembly is inverted the sealing contact between said tray and cover will prevent leakage of water at the peripheral joint therebetween.

10. A freezing device comprising: an open-top water tray having side walls, the upper peripheral edges of said side walls being of a resilient non-metallic material, a flexible cover for said tray resting upon the resilient material around the upper periphery of said tray when in its upright position and providing such a sealing fit thereupon that when the filled tray and cover assembly is inverted leakage of water at the joint between said tray and cover is prevented.

11. A freezing device comprising: an open-top water tray having side walls and having the peripheral upper edges of its side walls of resilient rubber, a metal cover for said tray resting by gravity upon said peripheral rubber edges in such sealing contact therewith that the assembly of the filled tray and cover can readily be inverted and set upon a cold support within a freezing chamber without any substantial leakage of water at the sealed joint between said tray and cover.

HARRISON C. BERKELEY